United States Patent
Schwaiger et al.

(10) Patent No.: US 6,863,519 B2
(45) Date of Patent: Mar. 8, 2005

(54) ADAPTER FOR AN EXTRUDER FOR PRODUCING PLASTIC PROFILES

(75) Inventors: Meinhard Schwaiger, Linz (AT); Franz Smutka, Vienna (AT)

(73) Assignee: Technoplast Kunststofftechnik GmbH, Micheldorf (AT)

(*) Notice: Subject to any disclaimer, the term of this patent is extended or adjusted under 35 U.S.C. 154(b) by 309 days.

(21) Appl. No.: 10/242,783

(22) Filed: Sep. 13, 2002

(65) Prior Publication Data

US 2003/0054065 A1 Mar. 20, 2003

(30) Foreign Application Priority Data

Sep. 17, 2001 (AT) ........................ GM715/2001

(51) Int. Cl.⁷ .................. B29C 47/12; B29C 47/86
(52) U.S. Cl. ................ 425/190; 425/378.1; 425/382.4; 425/467
(58) Field of Search ................ 425/190, 378.1, 425/376.1, 380, 382.4, 467, 468

(56) References Cited

U.S. PATENT DOCUMENTS 2,583,330 A * 1/1952 Eckert ..................... 425/404
6,499,987 B1 * 12/2002 Durina et al. ........... 425/192 R

FOREIGN PATENT DOCUMENTS

| DE | 658102 | 3/1938 |
| DE | 2017710 | 10/1970 |
| DE | 3222879 | 12/1983 |

* cited by examiner

Primary Examiner—Robert Davis
Assistant Examiner—Joseph S. Del Sole
(74) Attorney, Agent, or Firm—Dykema Gossett PLLC

(57) ABSTRACT

An adapter for an extruder for producing plastic profiles is provided for the purpose of being disposed between an extrusion cylinder and an extrusion die, with the basic body of the adapter comprising a flow channel which is delimited at one outer side by a wall surface of the basic body and at one inner side by a deflection body which is rigidly connected with the basic body. A careful homogenization of the melt can be achieved in such a way that the deflection body is provided with a substantially spherical arrangement and is exclusively held by a holding pin which is situated downstream and is connected via bridges with the adapter.

8 Claims, 4 Drawing Sheets

ADAPTER FOR AN EXTRUDER FOR PRODUCING PLASTIC PROFILES

BACKGROUND OF THE INVENTION

The invention relates to an adapter for an extruder for producing plastic profiles which is provided for the purpose of being disposed between an extrusion cylinder and an extrusion die, with the basic body of the adapter comprising a flow channel which is delimited at one outer side by a wall surface of the basic body and at one inner side by a deflection body which is rigidly connected with the basic body and is arranged in a substantially spherical fashion.

DESCRIPTION OF THE PRIOR ART

According to the state of the art, profiles are produced for example by extrusion from the plastic melt in a continuous process in an extrusion system. The starting material (e.g. powder, granulate) is plastified in an extruder and shaped under pressure in a die into an end profile strand and thereafter cooled off with a calibrating tool which consists of a dry and wet calibrator for example and is brought into the desired geometrical shape and finally formed into a cold endless profile strand. The cooling output required for the calibration and the vacuum energy are provided by the calibrating table receiving the calibrating tool.

As a result of continuous research development, there has been a considerable increase in the extrusion speed in the past years. Especially the cooling and calibrating tools have upwardly limited the possible extrusion speeds.

The inventors of the present invention have found indications through examinations that at the current level of development a relevant limitation of the extrusion speed can be found in the extruder itself. The production and preparation of the plastic melt occurs in the extrusion cylinder by means of special endless screws. Depending on the extrusion output and the processed plastic material different types and geometries of endless screws are used. For the purpose of producing profiles made of PVC for example mainly oppositely running double screw extruders for use in conical design for small and medium outputs and in parallel (cylindrical) design for medium to high outputs are used. Especially when using extruders in conical design there are inhomogeneities in the melt flow whose extent will increase at higher outputs. Said inhomogeneities have an effect in such a way that predominantly the inside surfaces of a profile, which for process-technical reasons cannot be calibrated, show unsteadiness, differences in wall thickness as well as pebblings on the surface and said unsteadiness can also be extend to the calibrated outside surface zones. As a result, this visual impairment of the inside and outside surfaces leads to a limitation in the performance of the extruder, which is partly far below the technical performance threshold.

Usually, the extrusion die is connected with the actual extrusion cylinder in which the screws are arranged via an adapter. In said adapter the cross section of the flow channel is converted continuously from the typical spectacle shape at the output of the extrusion cylinder to a shape adjusted to the profile contour. At the same time, a certain homogenization of the material occurs during the flow through the adapter. Obviously, such compensation processes are only possible up to a certain extrusion speed of the material, so that malfunctions will occur in the extrusion process in the case of a further increase.

Principally, an improvement in the homogeneity of a plastic melt can be achieved in such a way that the plastic melt is given sufficient time after the exit from the extruder and prior to the entrance into the melt channel of the die. Temperature inhomogeneities in the melt can dissolve within a certain period of time.

Said time interval, which is also known as dwell time, is represented by the melt throughput and the volume of the flow channel in the adapter.

The geometrically simplest form of the flow channel in the adapter is a cylindrical hollow chamber. The diameter and the length of the cylindrical hollow chamber determine the volume and with the melt throughput it is possible to determine the nominal dwell time. The inhomogeneous flow speed within the circular flow cross section is disadvantageous which is caused by the rheological properties of the plastic melts such as intrinsic viscosity, wall adherence and sliding depending on the occurring shearing stresses within the melt flow. A melt particle in the center of the circular flow cross section would be several times faster than the nominal flow speed, and a melt particle in the zone of the outer flow cross section shows a flow speed which corresponds to a fraction of the nominal flow speed.

The goal of a melt homogenization thus cannot be achieved with a cylindrical melt channel shape. Melt particles in the middle zone of the flow channel are too fast, whereas melt particles in the outer zone of the flow channel reach dwell times that are too long.

The dwell time is upwardly limited for plastic materials that are used most frequently. If this maximum permissible dwell time, which is known as thermostability, is exceeded, there will be thermal damage to the plastic melt which can express itself for example in a change of color, deposits of thermally destroyed particles up to an exothermal degradation of the plastic melt (PVC). Any further processing of the plastic melt is technically impossible in this case. A further disadvantage arises from the required large length of the flow channel which would lead to an unfavorable extension of the entire system.

A reduction in the overall length and a reduction of the dwell time differences are possible by changing the flow channel shape in such a way that the flow symmetrically flows around a torpedo. The shortest possible overall length is achieved when the torpedo is provided with a disk-like arrangement. The melt flow is characterized in this case by an approximately 90° deflection in a radially outwardly extending, continuously decreasing flow, a 90° deflection into a circular ring flow, a renewed 90° deflection into a radially inwardly directed, continuously increasing flow and a further 90° deflection into a cylindrical discharge flow which leads to an additional shearing stress of the melt and the still marked dwell time differences in the melt flow. Especially in the case of plastic melts made of PVC, additional shearing stresses have an influence on the rheological properties of the melt, i.e. the melt properties are changed, which is why the flow properties of the melt in the extrusion die are influenced and the geometrical properties of the extrudate are changed when exiting the die.

DE 32 22 879 A shows an adapter which comprises a mixing disk which is held via bridges and is outwardly flowed around by the melt. The mixing disk is provided with a relatively large diameter in comparison with its length, so that a relatively long flow channel with a respective dwell time is given. The deflection of the material leads to large shearing speeds, which on the one hand leads to a favorable through mixing, but on the other hand causes the said unsteadiness which has a disadvantageous effect on the profile quality. This specification further describes a mixing disk which is attached directly to the extruder screw and thus rotates with the speed of the screw. The effects as described above are increased even further by such a solution.

DE 658 102 A shows an extruder comprising a torpedo body which is held by laterally projecting ribs. Such an apparatus cannot be easily used in the production of plastic profiles because an interruption of the flow path is produced by the ribs.

SUMMARY OF THE INVENTION

It is the object of the present invention to avoid the disadvantages and to provide an adapter which allows a further increase in the extrusion speed without producing the likelihood of quality deficiencies in the produced plastic profile.

In accordance with the invention the deflection body is provided with a substantially spherical arrangement and is held exclusively by a holding pin which is situated upstream and is connected with the adapter via bridges.

It is surprisingly ensured by this inventive measure that despite favorable homogenization there is a steadying of the material, leading to an outstanding profile quality. The relevant aspect in the invention is that the bridges of the deflection body which are situated upstream do not cause any impairments to the quality because the deflection eliminates the arising disturbances. The deflection body need not exactly assume the geometrical shape of a sphere; the relevant aspect in the shape is an approximately even extension in all directions and the avoidance of edges or roundings with small radiuses. It is particularly favorable in this connection when the deflection body is provided with a rotationally symmetrical arrangement and is provided with an axial length which is between 0.8 times and two times, preferably between 0.9 times and 1.2 times the diameter in the equatorial plane.

An even thickness of the flow channel can be achieved when the wall thickness of the basic body is substantially spherical and is arranged concentrically to the deflection body.

A slight adjustment of the dimensions of the deflection body to different extrusion speeds can simply be achieved in such a way that the deflection body is detachably fastened to the holding pin. As a result, a larger deflection body can be inserted at lower extrusion speeds because the required dwell time is lower in this case. Conversely, smaller deflection bodies will be used at higher extrusion speeds in order to increase the dwell time.

A particularly simple production and maintenance is enabled in such a way that the basic body is divided in the zone of the equatorial plane of the deflection body.

An efficient temperature management of the extruded material can be achieved when both the first heating apparatus for heating the material melt disposed in the flow channel from the outside as well as a further heating apparatus in the deflection body for heating the material from the inside are provided. The rheological properties of the material can thus be positively influenced.

The present invention further relates to an apparatus for extruding plastic profiles consisting of an extruder with an extrusion cylinder which comprises at least one, preferably two endless screws for conveying the plastic melt, as well as an adapter and an extrusion die adjacent thereto, in which the adapter is arranged as described above.

BRIEF DESCRIPTION OF THE DRAWINGS

The invention is now explained in closer detail by reference to the embodiments shown in the drawings, wherein.

DETAILED DESCRIPTION OF THE PREFFERED EMBODIMENTS

Figure 1:
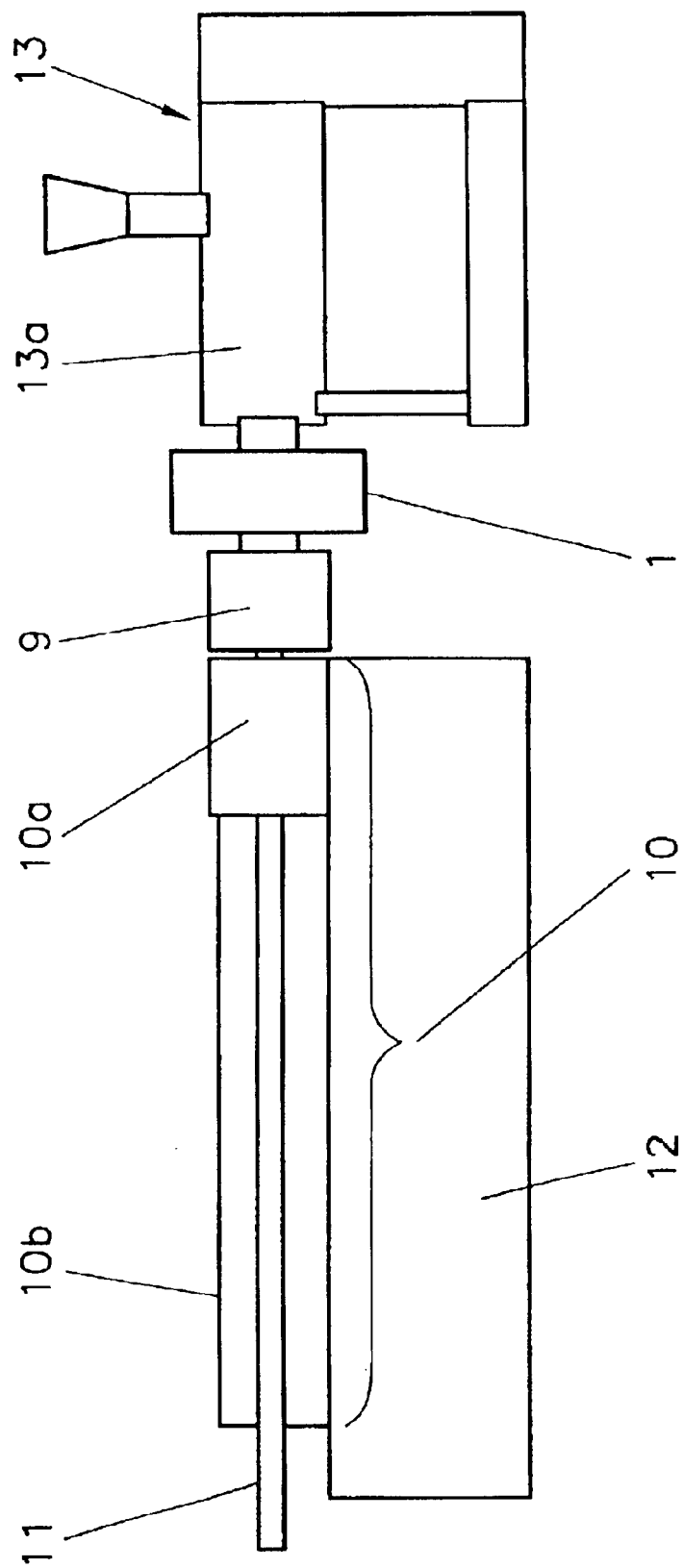
FIG. 1 shows the general structure of an extrusion line by using an adapter according to the present invention.

The extrusion line of FIG. 1 consists of an extruder 13 with an extrusion cylinder 13a to which an extrusion die 9 is connected via an adapter 1. A plastic profile strand 11 is extruded from the extrusion die 9 for the production of windows for example. The profile strand 11 which is in a doughy state is cooled and calibrated in a cooling and calibrating device 10 in the known manner, which cooling and calibrating device consists of the dry calibration 10a and the wet calibration 10b which are arranged on a calibrating table 12. Components such as caterpillar pull-off and flying saw (not shown) are arranged downstream in order to produce the individual profile bars.

The adapter 9 consists of a basic body 1a, 1b with a recess 2 in the shape of a hollow sphere to which flanged parts 14, 15 are adjacent. A cylindrical inlet channel 6 is provided in the upstream flanged part 15 and an outlet channel 5 in the downstream flanged part 14, which outlet channel is also cylindrical. Together with the inlet channel 6 and the outlet channel 5 the spherical recess 2 forms the flow channel for the plastic melt to be extruded. The progress of the flow is indicated by the arrows 16. A spherical deflection body 3 is arranged concentrically to the spherical recess 2 in the basic body 1a, 1b. The deflection body 3 is carried by a cylindrical holding pin 4 which is held in the inlet channel 6 by three bridges 17. The deflection body 3 is detachably connected with the holding pin 4 via screws (not shown).

The basic body 1a, 1b is divided in the equatorial plane 18 of the deflection body 3, and the two halves 1a, 1b are held together by screws 8.

A strip heater 7 is guided externally around the basic body 1a, 1b in order to prevent any excessive cooling of the melt to be extruded.

Figure 2:
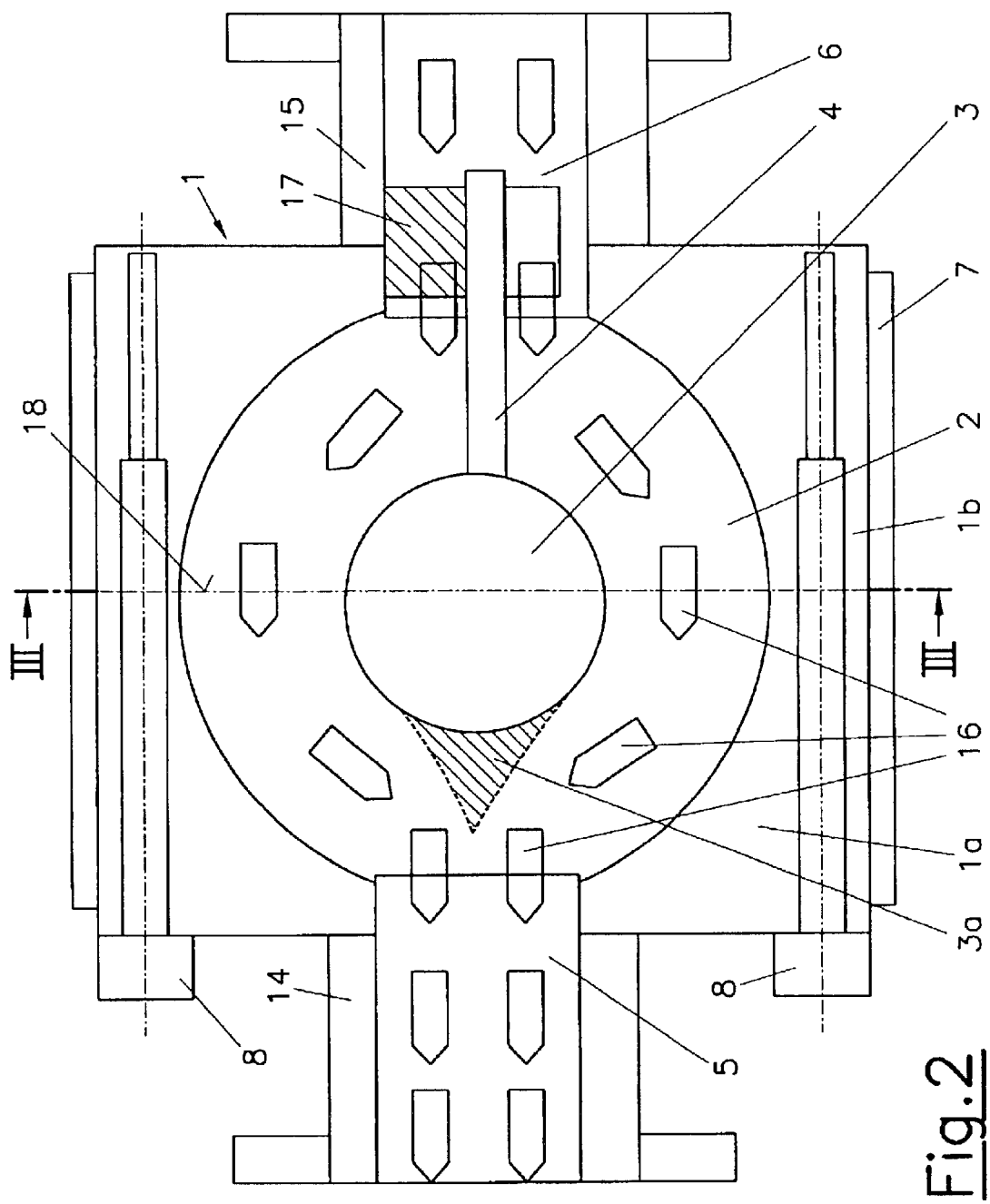
FIG. 2 shows a longitudinal sectional view through the adapter in accordance with the invention.
Figure 3:
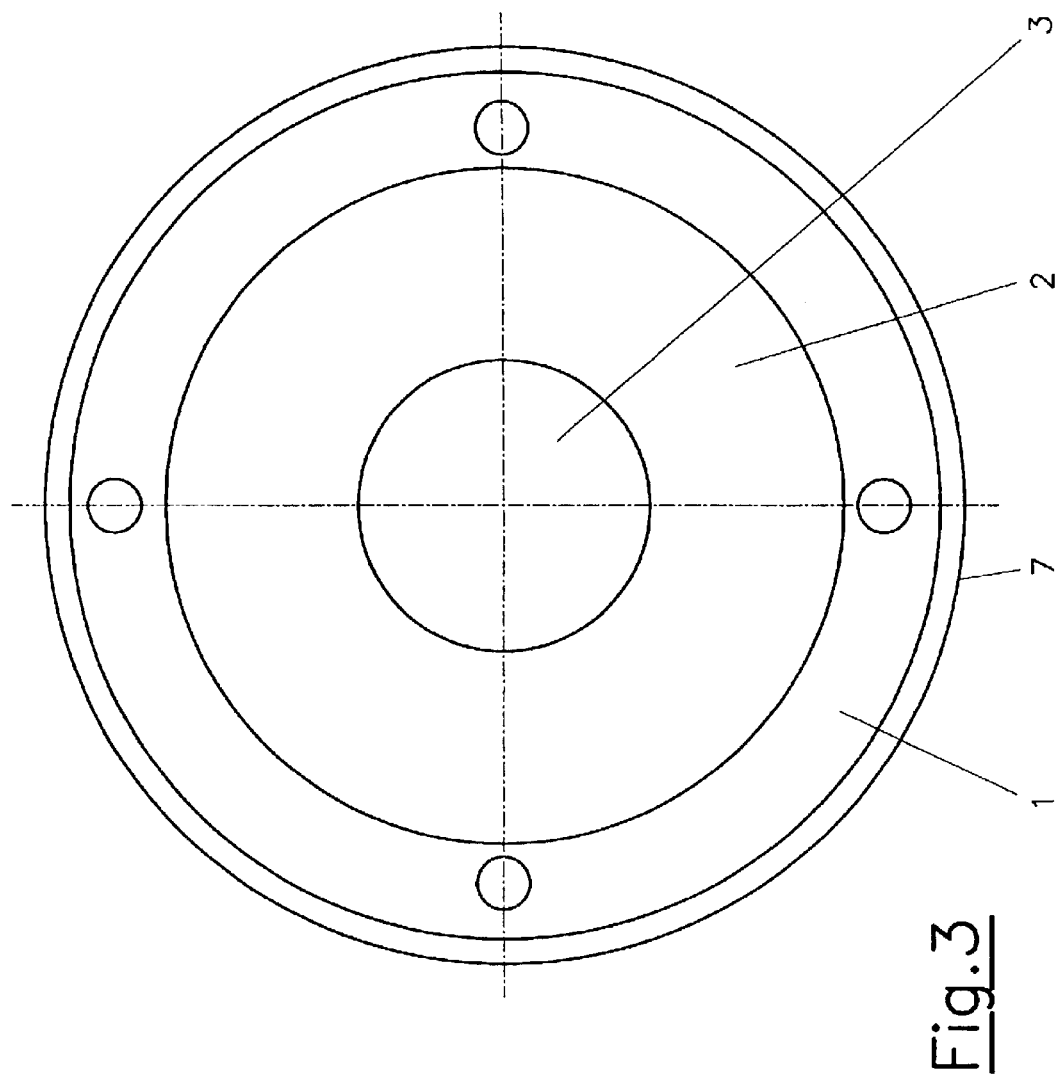
FIG. 3 shows a sectional view along line III—III in FIG. 2.

In order to prevent a flow detachment in the downstream zone of the spherical deflection body 3, a extension 3a is provided which is shown in FIG. 2 with the broken lines.

Figure 4:
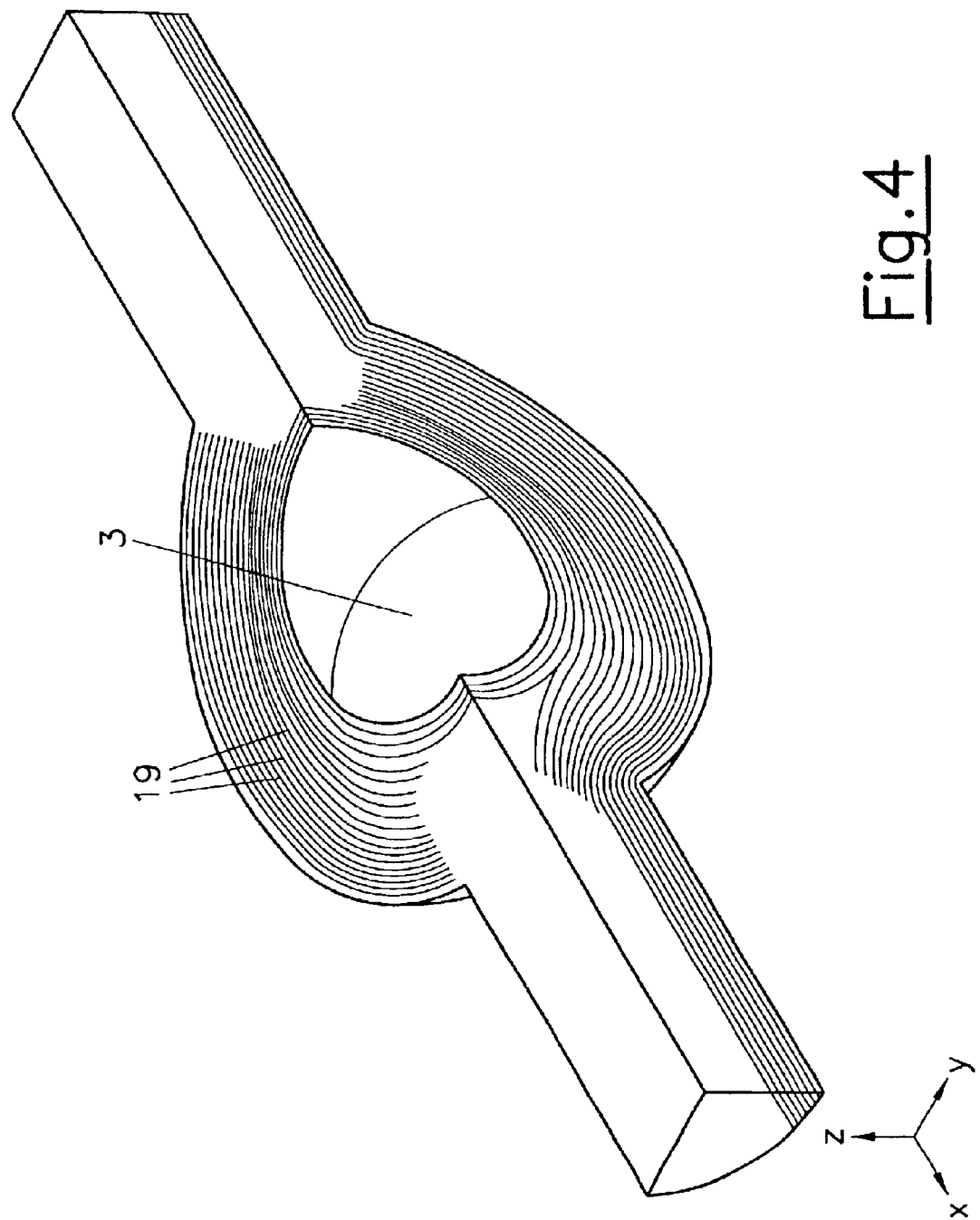
FIG. 4 shows a diagram which shows the flow conditions as determined by calculation in an adapter according to the invention.

The diagram of FIG. 4 schematically shows the streamlines 19 for such a deflection body.

It is ensured as a result of the adapter 9 in accordance with the invention that the plastic melt is deflected so as to achieve an increased dwell time. The deflection is connected with such low shearing rates that a calmed state prevails at the outlet of the adapter 9, which thus allows a high quality of the profile.

What is claimed is:

1. An adapter for an extruder for producing plastic profiles being disposed between an extrusion cylinder and an extrusion die, with the basic body of the adapter comprising a flow channel which is delimited at one outer side by a wall surface of the basic body and at one inner side by a spherical deflection body which is rigidly connected with the basic body, which deflection body is held by a holding pin only which is connected with the adapter via bridges.

2. An adapter according to claim 1, wherein the deflection body is provided with a rotationally symmetrical arrangement and is provided with an axial length which is between 0.8 times and two times, the diameter in the equatorial plane.

3. An adapter according to claim 1, wherein the deflection body is provided with a rotationally symmetrical arrangement and is provided with an axial length which is between 0.9 times and 1.2 times, the diameter in the equatorial plane.

4. An adapter according to claim 1, wherein the wall surface of the basic body is arranged substantially spherical and concentric to the deflection body.

5. An adapter according to claim 1, wherein the deflection body is detachably fastened to the holding pin.

6. An adapter according to claim 1, wherein the basic body is divided in the zone of the equatorial plane of the deflection body.

7. An adapter according to claim 1, wherein there is provided a first heating apparatus for heating the material melt disposed in the flow channel from the outside as well as a further heating apparatus in the deflection body for heating the material from the inside.

8. An apparatus for extruding plastic profiles, consisting of an extruder with an extrusion cylinder which comprises at least one, preferably two endless screws for conveying the plastic melt, as well as an adapter according to claim 1 and an extrusion die adjacent thereto.

* * * * *